(12) United States Patent
Mügge

(10) Patent No.: US 9,404,633 B2
(45) Date of Patent: Aug. 2, 2016

(54) LIGHTING DEVICE FOR VEHICLES

(71) Applicant: Hella KGaA Hueck & Co., Lippstadt (DE)

(72) Inventor: Martin Mügge, Geseke (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 57 days.

(21) Appl. No.: 14/477,579

(22) Filed: Sep. 4, 2014

(65) Prior Publication Data
US 2015/0078024 A1  Mar. 19, 2015

(30) Foreign Application Priority Data
Sep. 19, 2013  (DE) .......................... 10 2013 110 345

(51) Int. Cl.
| | |
|---|---|
| F21S 8/10 | (2006.01) |
| F21V 21/00 | (2006.01) |
| B60Q 1/00 | (2006.01) |
| B60Q 1/26 | (2006.01) |

(52) U.S. Cl.
CPC ........... F21S 48/2212 (2013.01); B60Q 1/0041 (2013.01); B60Q 1/2607 (2013.01); F21S 48/215 (2013.01); F21S 48/2243 (2013.01); F21S 48/2262 (2013.01); F21S 48/2287 (2013.01); F21S 48/238 (2013.01); F21S 48/24 (2013.01)

(58) Field of Classification Search
CPC . F21S 48/2212; F21S 48/2243; F21S 48/238; F21S 48/215; F21S 48/2262; F21S 48/2287; F21S 48/24; B60Q 1/0041; B60Q 1/2607

USPC .............. 362/97.1, 97.2, 97.3, 516, 520, 545, 362/544
See application file for complete search history.

(56) References Cited

U.S. PATENT DOCUMENTS

| | | | | |
|---|---|---|---|---|
| 4,111,383 A | * | 9/1978 | Allen ........................ | F41G 7/26 244/3.13 |
| 4,978,942 A | * | 12/1990 | Bruce ................... | G08B 15/001 250/221 |
| 2005/0180157 A1 | * | 8/2005 | Watanabe ........... | F21S 48/1104 362/543 |
| 2011/0216549 A1 | * | 9/2011 | Futami ...................... | F21V 5/00 362/516 |

FOREIGN PATENT DOCUMENTS

| | | |
|---|---|---|
| DE | 102010048660 A1 | 4/2012 |
| DE | 102010061210 A1 | 6/2012 |
| DE | 102012008833 A1 | 11/2012 |
| DE | 102012103368 A1 | 10/2013 |
| DE | 102012106472 A1 | 1/2014 |

* cited by examiner

Primary Examiner — Anh Mai
Assistant Examiner — Glenn Zimmerman
(74) Attorney, Agent, or Firm — Husch Blackwell LLP

(57) ABSTRACT

A lighting device for vehicles, having a housing, in which a light module, containing a light source and a lens unit allocated thereto, is disposed, for generating a lighting function, wherein the light source is designed as a light source emitting a linear light distribution, and the lens unit has optical means for converting the linear light distribution of the light source into another linear light distribution, for generating a predefined lighting function.

9 Claims, 2 Drawing Sheets

LIGHTING DEVICE FOR VEHICLES

CROSS REFERENCE

This application claims priority to German Application No. 10 2013 110345.6, filed Sep. 19, 2013, which is hereby incorporated by reference.

FIELD OF THE TECHNOLOGY

The invention relates to a lighting device for vehicles having a housing, in which a light module, containing a light source and a lens unit allocated thereto, is disposed, for generating a light function, characterized in that the light source is designed as a light source emitting a linear light distribution, and in that the lens unit has optical means for converting the linear light distribution of the light source into another linear light distribution for generating the predefined lighting function.

BACKGROUND

The use of LED light sources for lighting devices of vehicles is known, which emit light corresponding to a cosine-shaped light distribution in a half-space. Normally, a lens unit consisting of a reflector, an optical waveguide, or a lens, is mounted in front of the LED light source, in order, for example, to form a light distribution for a predefined lighting function, to generate, e.g. a blinker lighting function or a daytime running lights lighting function. The conversion into the light distribution thus occurs substantially by means of an lens unit mounted in front thereof, which must exhibit a specific structure and dimensions. By way of example, a lens unit of this type, mounted directly in front of the LED light source, is known from U.S. Pat. No. 8,475,019 B2, which is designed as a plate-shaped optical waveguide. The efficiency of the lens unit is substantially determined by how much light of the light source can be used. With a cosine-shaped light distribution of the light source and small light surfaces of the lens unit, such as a narrow light entry surface of an optical waveguide, significant light portions of the light source, which are emitted at lateral angles, cannot be acquired and used.

SUMMARY OF THE INVENTION

The object of the invention is thus to further develop a lighting device for vehicles, such that an optimized light distribution of the light source can be generated, or an optimized light source in a lens unit can be used, in a simple and effective manner.

In order to achieve this objective, the invention is characterized in that the light source is designed as a light source emitting a linear light distribution, and in that the lens unit has optical means for converting the linear light distribution of the light source into a light distribution for generating the predefined lighting function.

The particular advantage of the invention is that the light source already basically emits a linear light distribution, such that the complexity of the light conversion by means of the lens unit mounted in front thereof can be reduced. The lens unit has optical means, such that a modified second light bundle is obtained from the incident linear light bundle, which is emitted as a light bundle for a signal function in the main beam direction in the environment. The light source itself, or a primary lens allocated directly to the light source, generates a linear light distribution, in which a linear light bundle is supplied to the lens unit at the light entry side. In this manner, a light pre-shaping already occurs, before the light emitted from the light source reaches the lens unit, in that the pre-shaped light bundle resembles, or is identical to, the light bundle that is to be emitted from the lighting device, and a narrow light entry surface of an optical waveguide, or a narrow reflector, is acted on in an optimal manner by the pre-shaped linear light distribution of the light source, and thus a higher efficiency is obtained.

According to a preferred embodiment of the invention, the light source is designed as a semiconductor light source, which is either designed as a laser diode, by means of which a linear light distribution can be generated, or as a light emitting diode or laser diode, having a primary lens mounted directly in front of it, by means of which the linear light distribution is generated. By means of the linear light shaping of the light at or near to the light source, a focusing of the light into a limited space occurs, such that the lens unit can be disposed at a greater spacing to the light source. This increases the variability in the configuration and construction of numerous lens units in a housing for a lighting device in which numerous lighting functions are to be provided.

According to one preferred embodiment of the invention, the lens unit is designed as a plate-shaped optical waveguide element, having a light coupling narrow side, such that a luminous line generated by means of the light source can be directed toward this light coupling narrow side. The lens unit can thus be disposed at a spacing to the light source, wherein, due to the focusing of the luminous line emitted from the light source, the entire light from the light source is mapped onto this light coupling narrow side, without any light passing beside it. The spacing between the light source and the lens unit depends on the desired linear light distribution and the size of the light coupling surface.

According to a further development of the invention, the lens unit is designed as a deflecting reflector, which can be disposed at a spacing to the light source, and enables a deflection of a light band generated by the linear light distribution into the main beam direction. Due to the relatively large spacing between the light source and the deflection reflector, potentially disruptive reflections can be minimized in the switched-off state of the lighting device. The location of the light source is not immediately apparent to the observer. The light appears to originate from "nowhere," because only the reflector surface is visible. The light source can be disposed in an edge region of the housing, without the need for a separate aperture.

According to a further development of the invention, numerous light modules, each containing a light source for a linear emitted light bundle, and a lens unit mounted in front thereof, are disposed within the housing for the lighting device, such that light paths between the light source and the lens unit in various light modules intersect and/or cross. Advantageously, the light sources can thus be disposed at the edge of the housing, without their being visible to an observer. In particular, the light sources can also be disposed on different sides of the housing, enabling a more compact construction of the lighting device.

According to a further development of the invention, the lens unit can comprise a plate-shaped optical waveguide having a conical light coupling section, wherein the conical light coupling section has a concave light coupling surface, on which the light source is disposed directly. Advantageously, the light inside this plate-shaped optical waveguide can spread out in a conical manner, and strike a forward light decoupling surface, by means of which the light is emitted such that it corresponds to a desired light distribution for a signal function.

BRIEF DESCRIPTION OF THE DRAWINGS

Reference is now made more particularly to the drawings, which illustrate the best presently known mode of carrying out the invention and wherein similar reference charac-ters indicate the same parts throughout the views.

DETAILED DESCRIPTION OF THE DRAWINGS

A lighting device for vehicles can be incorporated in a rear or front region of a motor vehicle.

Figure 1:
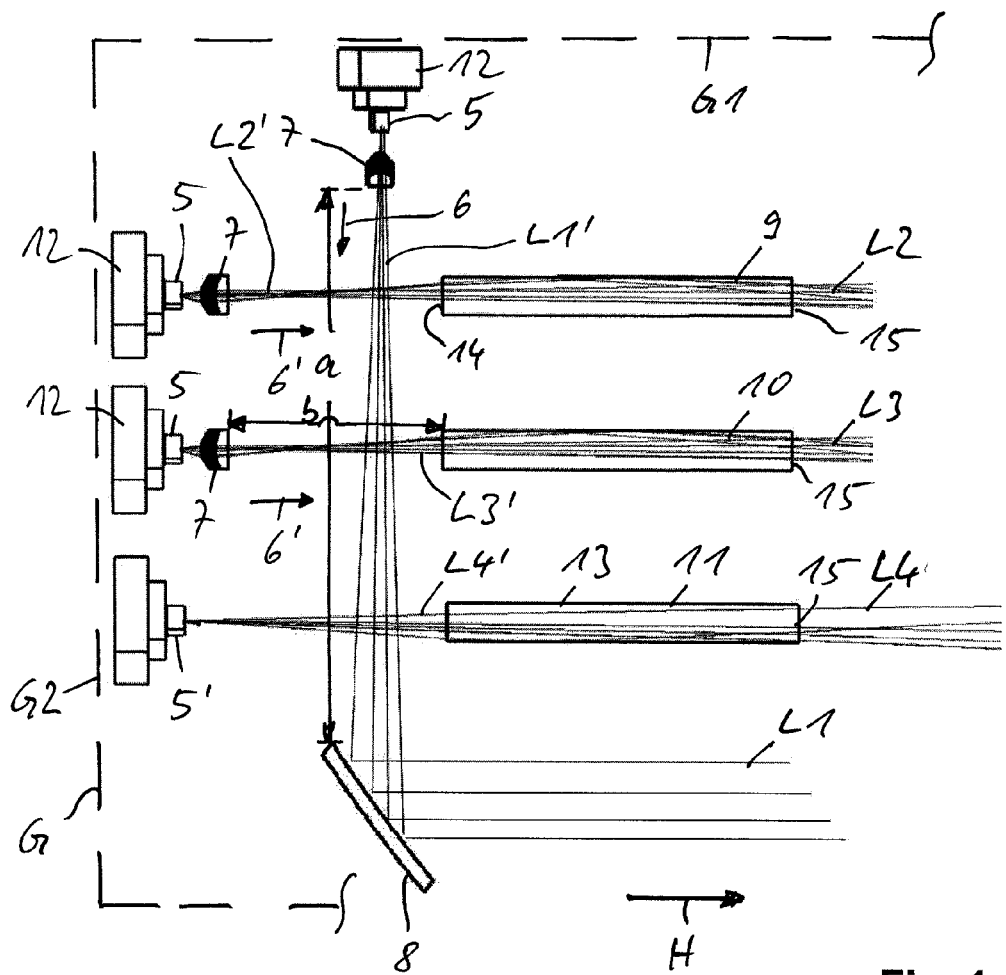
FIG. 1 is a schematic side view of a lighting device having numerous light modules.

Four light modules 1, 2, 3, 4 are provided in an embodiment example of the invention in accordance with FIG. 1, each of which emits an elongated, preferably linear or rectangular, light distribution L1, L2, L3, L4 in the main beam direction H, for generating various and/or identical lighting functions, such as taillights, brake lights, blinkers, or reversing lights.

The light modules 1, 2, 3, 4 each comprise semiconductor light sources. The first light module 1, the second light mod-ule 2, and the third light module 3 each comprise a light emitting diode 5 (LED light source), having a primary lens designed as a primary lens element 7, disposed directly in front thereof, in the light emission direction 6, for generating a linear light distribution L1', L2', L3', which strikes a lens unit 8, 9, 10, mounted in front thereof, in the shape of a luminous line or a luminous band. Because the primary lens element 7 is disposed in the immediate proximity of the light emitting diodes 5, wherein the primary lens element 7, can, for example, be attached to a retaining means 12 of the light emitting diode 5, the light emitting diode 5 and the primary lens element 7 together form a light source component.

The fourth light module 4 comprises a laser diode 5' as a semiconductor light source, which is capable of emitting a linear light distribution. Alternatively, a primary lens element can also be mounted in front of the laser diode, if it is not capable of emitting a linear light distribution.

The first light module 1 has a deflection reflector as the lens element 8, which deflects the light bundle L1' emitted from the light emitting diode 5, or the prism lens element 7, respec-tively, through 90°, and emits this light bundle L1' as a linear light bundle L1 in the main beam direction H. Due to the linear focusing by means of the prism lens element 7, the light bundle L1' strikes the deflection reflector 8 as a linear light band.

The light source components 5, 7 can be disposed at a spacing a to the deflection reflector 8, wherein the spacing a can correspond to nearly the height of a housing G for the lighting device. The deflection reflector 8 is designed in the shape of a channel, and exhibits reflector surfaces that com-prise diffusion elements. The diffusion elements can be designed as cushion, striped, or prism lens elements. Further-more, the diffusion elements can also be applied by means of electrical discharge machining, or etching, or by means of laser beams.

The second and third light modules 2, 3 are identical, wherein they are disposed vertically offset to one another. The second lens element 9 and the third lens element 10 each comprise a plate-shaped optical waveguide element as the optical means, which exhibits opposing flat surfaces 13 and a light coupling narrow side 14 facing the light emitting diode 5, and a light decoupling narrow side 15 facing away from the light source 5.

The light source component formed by the light emitting diode 5 and the prism lens element 7 is disposed at a spacing b to the plate-shaped optical waveguide element 9 or 10, respectively. The light bundle L2', L3' emitted from the light source component results in a linear light distribution upstream of the plate-shaped optical waveguide element 9, 10, which strikes the light coupling narrow side 14 of the plate-shaped optical waveguide element 9, 10 in the form of a luminous line. A light emission direction 6' of the light emit-ting diodes 5 in the second and third light modules 2, 3 is directed in the main beam direction H.

The fourth light module 4 differs from the second and third light modules 2, 3 substantially in that the laser diode 5' serves as a light source. The light bundle L4' emitted from the laser diode 5' is conducted as a luminous line to the fourth lens unit 11 designed as a plate-shaped optical waveguide element, from which it is emitted as a linear light distribution L4 for generating the lighting function. The fourth lens unit 11 like-wise comprises a light coupling narrow side 14 facing the laser diode 5', and a light decoupling narrow side 15 facing away from the laser diode 5', as well as opposing flat surfaces 13.

Identical components, or component functions, respec-tively, of the embodiment examples, or the light modules, respectively, are provided with identical reference symbols. The second light module 2, the third light module 3, and the fourth light module 4 are thus designed oriented in the same direction, specifically the main beam direction H, wherein the axes of the light sources 5, 5' face in the main beam direction H, while an optical axis of the first light module 1 is disposed such that it is oriented at a right angle to the main beam direction H.

As can be seen from FIG. 1, the light bundle L1' running between the light source 5 and the lens unit 8 of the first light module 1 crosses the light bundles L2', L3', L4', each of which runs between the light sources 5, 5' of the second, third, and fourth light modules 1 and the lens units 9, 10, 11 thereof. The light source 5 of the first light module 2, 3, 4 is preferably disposed on an upper wall G1 of the housing G, while the light sources 5, 5' of the second, third, and fourth light modules 2, 3, 4 are attached to a back wall G2 of the housing G. In this manner, a compact construction of the light modules 1, 2, 3, 4 can be obtained, in which, in particular, the light sources 5, 5' of the light modules 1, 2, 3, 4 are not immediately visible to the observer.

It is to be understood that the lighting device can also exhibit a different number of light modules. In particular, it is also possible that the lighting device exhibits, in each case, one of the light modules 1, 2, 3, 4.

Figure 2:
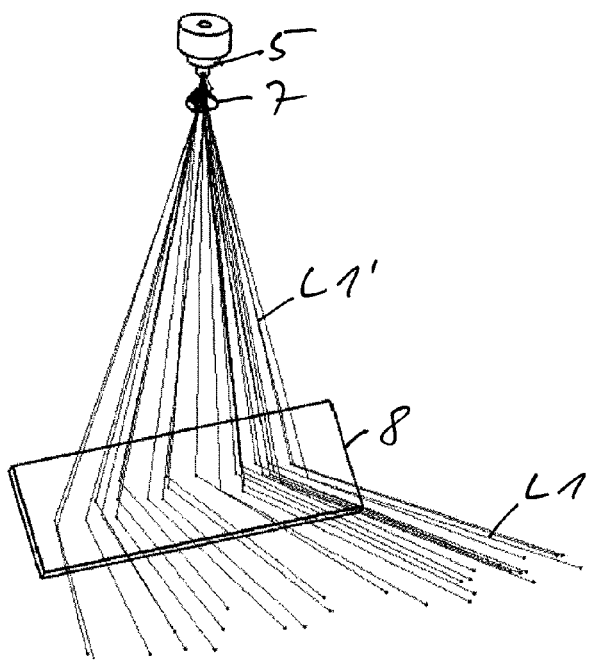
FIG. 2 is a perspective front view of a first light module having a light emitting diode as the light source, and a primary lens element disposed in the close proximity thereof, and a lens element designed as a channel-shaped reflector.
Figure 3:
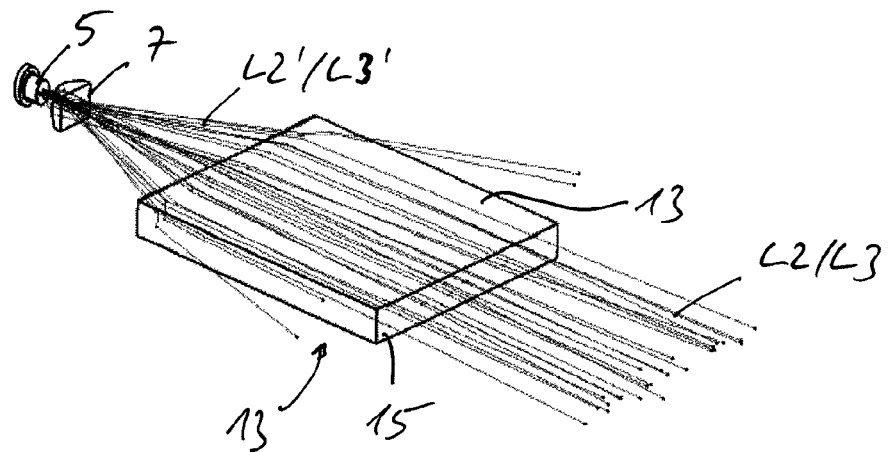
FIG. 3 is a perspective front view of a second light module, having a light emitting diode as the light source, and a primary lens element disposed in the close proximity thereof, and a lens element designed as a plate-shaped optical waveguide.
Figure 4:
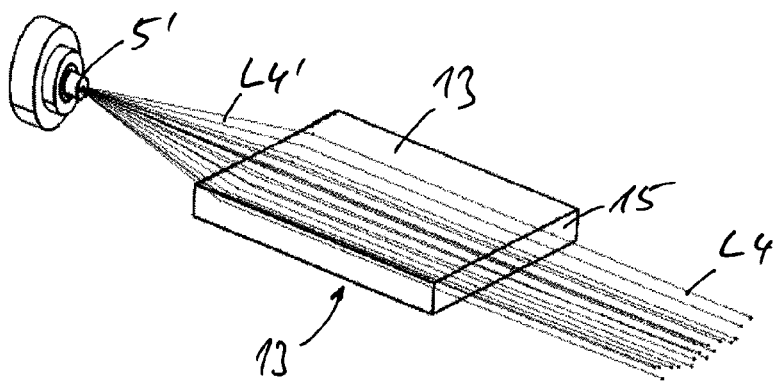
FIG. 4 is a perspective front view of another light module, having a laser diode as the light source, and a plate-shaped optical waveguide, which is mounted in front thereof as a lens unit.

The first light module is depicted in FIG. 2 individually. The second light module, or third light module, respectively, is depicted individually in FIG. 3, while the fourth light module is depicted individually in FIG. 4.

The light coupling narrow side 14 of the plate-shaped optical waveguide elements 9, 10, 11 can be smooth or provided with diffusion elements, wherein the diffusion elements are designed as cushion, striped, or prism lens elements. The diffusion elements can be generated by means of electrical discharge machining, etching, or by means of laser beams.

It is visible in FIG. 1 that light paths of the first light module 1, on one hand, and the other light modules 2, 3, 4, on the other hand, cross thereby, this being in a region between the light sources 5, 5' and the lens units 8, 9, 10, 11. In this manner, a compact construction of the lighting device is ensured.

Figure 5:
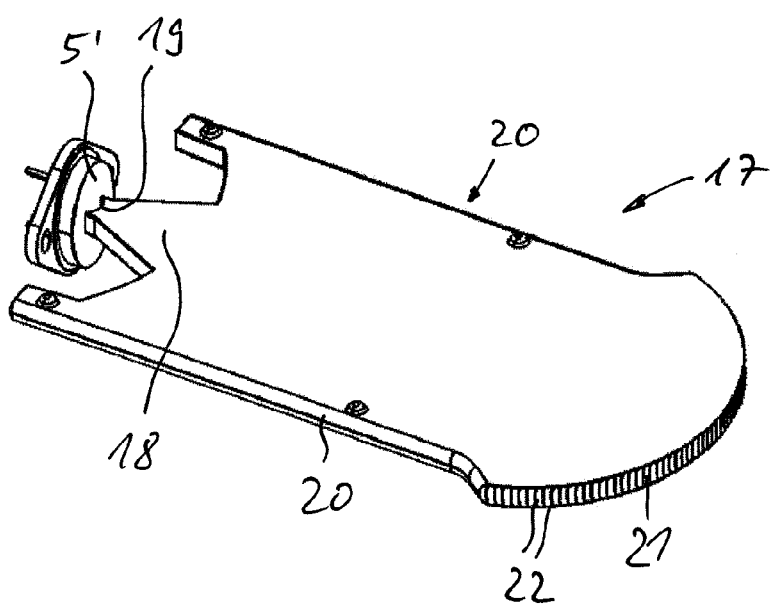
FIG. 5 is a perspective front view of a light module, having a laser diode as the light source, directly in front of which a plate-shaped optical waveguide is mounted as a lens unit.

According to a further embodiment of the invention in accordance with FIG. 5, a plate-shaped optical waveguide element having a conical light coupling section 18 is provided as the lens unit 17, which has a concave light coupling surface 19. The light coupling surface 19 is allocated to the laser diode 5'. The laser diode 5' emits a linear light, which is coupled in the optical waveguide element 17, and then conducted further, by means of total internal reflection, substantially at the narrow lateral surfaces 20, toward a bowed light decoupling surface 21, at which the light is emitted linearly, forming a linear light distribution for generating the defined lighting function. The light decoupling surface 21 exhibits stripe-shaped diffusion elements 22 for generating the desired linear light distribution.

REFERENCE SYMBOLS 1 first light module
2 second light module
3 third light module
4 fourth light module
5, 5' light emitting diode (LED light source)
6, 6' light emission direction
7 primary lens element
8, 9, 10, 11 lens unit
12 retaining device
13 flat surface
14 light coupling narrow side
15 light decoupling narrow side
17 lens unit
18 light coupling section
19 light coupling surface
20 lateral surfaces
21 light decoupling surface
22 diffusion element
L1, L2, L3, L4,
L1', L2', L3', L4' light bundle
H main beam direction
a, b spacing
G, G1, G2 housing (walls)

The invention claimed is:

1. A lighting device for vehicles comprising:
   a housing in which a light module containing a light source and a lens unit allocated thereto is disposed for generating a lighting function,
   wherein the light source emits a linear light distribution;
   wherein a primary lens for generating the linear light distribution is mounted in front of the light source;
   wherein the lens unit has optical means for converting the linear light distribution into a light distribution for generating the predefined lighting function; and
   wherein numerous light modules are provided in the housing, wherein the light sources are disposed at a spacing to the respective lens units allocated thereto, such that light paths of at least two light modules, formed between the light source and the lens unit, at least one of intersect and cross.

2. The lighting device according to claim 1, wherein the light source is designed as a semiconductor light source, wherein the semiconductor light source is formed by one of a laser diode that directly emits a linear light distribution and
   a light emitting diode or laser diode provided with a primary lens for generating a linear light distribution, mounted in front thereof in the light emission direction.

3. The lighting device according to claim 1, wherein the lens unit has a plate-shaped optical waveguide element, which is disposed with a light coupling narrow side facing the light source,
   wherein the plate-shaped optical waveguide element is disposed at a spacing in front of the light source, in the light emission direction, such that a luminous line of the light source caused by the linear light distribution strikes the light coupling narrow side exclusively.

4. The lighting device according to claim 1, wherein the lens unit has a deflection reflector that is disposed at a spacing in front of the light source, in the light emission direction, such that a luminous band caused by the linear light distribution is deflected at an angle into the main beam direction.

5. The lighting device according to claim 1, wherein numerous light modules, each containing a plate-shaped optical waveguide are disposed adjacent to one another in the vertical or horizontal direction, and in that the light bundle of the light module containing the deflection reflector crosses at least one light bundle of the other light modules in a region between the light source and the deflection reflector, wherein the light bundles of the other light modules extend between the light sources on one side, and the lens units of the other light modules.

6. The lighting device according to claim 3, wherein the light coupling narrow side of the plate-shaped optical waveguide element is flat or provide with diffusion elements, wherein the diffusion elements are designed as cushion, striped, or prism lens elements, or in that the diffusion elements are produce by means of electrical discharge machining, etching, or laser beams.

7. The lighting device according claim 3, wherein the plate-shaped optical waveguide has a conical light coupling section with a concave light coupling surface.

8. The lighting device according to claim 4, wherein the deflection reflector is designed in the shape of a channel, and exhibits a reflection surface comprising numerous diffusion elements,
   wherein the diffusion elements are designed as cushion, striped, or prism elements, or are produced by means of electrical discharge machining, etching, or laser beams.

9. The lighting device according to claim 7, wherein the plate-shaped optical waveguide has a narrow light decoupling surface, which is provided with diffusion elements for generating the predefined lighting function.

* * * * *